US006633232B2

(12) United States Patent
Trajkovic et al.

(10) Patent No.: US 6,633,232 B2
(45) Date of Patent: Oct. 14, 2003

(54) METHOD AND APPARATUS FOR ROUTING PERSONS THROUGH ONE OR MORE DESTINATIONS BASED ON A LEAST-COST CRITERION

(75) Inventors: Miroslav Trajkovic, Ossining, NY (US); Srinivas Gutta, Buchanan, NY (US); Vasanth Philomin, Briacliff Manor, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 160 days.

(21) Appl. No.: 09/855,104

(22) Filed: May 14, 2001

(65) Prior Publication Data

US 2002/0167408 A1 Nov. 14, 2002

(51) Int. Cl.[7] ............................................... G08B 23/00
(52) U.S. Cl. .............................. 340/573.1; 340/573.4; 348/143
(58) Field of Search ....................... 340/541, 573.1, 340/573.3, 573.4, 568.5, 934, 937; 348/139, 142, 143, 159, 169; 709/217, 231, 247; 700/56; 7013/26, 117; 345/848

(56) References Cited

U.S. PATENT DOCUMENTS

| | | | | |
|---|---|---|---|---|
| 5,083,256 A | * | 1/1992 | Trovato et al. | 700/56 |
| 5,097,328 A | * | 3/1992 | Boyette | 348/150 |
| 5,298,697 A | * | 3/1994 | Suzuki et al. | 348/135 |
| 5,581,625 A | * | 12/1996 | Connell | 348/139 |
| 5,598,208 A | * | 1/1997 | McClintock | 348/159 |
| 6,215,519 B1 | * | 4/2001 | Nayar et al. | 348/159 |

OTHER PUBLICATIONS

Workshop on Human Motion HUMO 2000, Austin, Texas, Dec. 7–8, 2000 Sponsored by IEEE Computer Society, pp.: 127–133: "Person Counting Using Stereo," by David Beymer.

* cited by examiner

Primary Examiner—Van Trieu
(74) Attorney, Agent, or Firm—Gregory L. Thorne

(57) ABSTRACT

A vision system that is capable of computing the crowd densities, shopper movement speed and direction, and queue lengths at different locations in a shopping center makes recommendations for least-cost path through a set of destinations. Well-known person-counting techniques may be employed. One type of output display is a map display with an overlay an optimal route through a shopping venue.

21 Claims, 10 Drawing Sheets

METHOD AND APPARATUS FOR ROUTING PERSONS THROUGH ONE OR MORE DESTINATIONS BASED ON A LEAST-COST CRITERION

BACKGROUND OF THE INVENTION

1. Field of the Invention

The invention relates to automated crowd pattern classification systems and also to systems that automatically detect movement of groups of people and route persons based on crowd pattern and movement.

2. Background

The options available to a customer upon arrival at a shopping mall or other space where multiple destinations are to visited are many and complex. Often, a customer wishes simply to obtain a few items and leave as efficiently as possible. Some customers, for health reasons, may wish to minimize total walking distance. Others may wish to minimize time spent shopping. Although store maps are normally provided at such places, they do not provide any information about how long a visit to a particular store will take. For example, the lines may be long at one store and shorter at another. Stores belonging to a given class may be equally good in the eyes of the user, but the time spent determining which is least crowded may end up wasting more time than save if the lesser-crowded store were known in advance.

Surveillance systems are known in which images from remote cameras are gathered in a specific location and monitored by human observers. Also, automated systems for face-recognition, gesture recognition for control of presentation devices such as audio visual presentation equipment or a speaker-following video camera.

U.S. Pat. No. 5,712,830, which is hereby incorporated by reference as if fully set forth herein in its entirety, describes a system for monitoring the movement of people in a shopping mall, vicinity of an ATM machine, or other public space using acoustical signals. The system detects acoustical echoes from a generator and indicates abnormal conditions. For example, movement may be detected at night in a secure area and an alarm generated. Also, by providing vertical threshold detection, the system may be used to distinguish adults and children. Movement may be detected by identifying patterns of holes and peaks in return echoes. The applications contemplated are detection of shoplifting, queues, running people, shopper headcount, disturbances or emergencies, and burglary.

There is a need in the art for a mechanism for detecting information about visitor movement and concentration at stores and exhibition-like events for purposes of helping visitors to determine the places they wish to visit and the routes they should take. Also, there is a need in the art for systems that will advise visitors as to how best to visit multiple locations within a large space, for example: stores in a shopping mall. Planning such a route is made more complicated than simply a minimum path problem by the traffic patterns and level of activity at the various retail locations and the visitor's lack of knowledge about such impediments.

SUMMARY OF THE INVENTION

Briefly, one or more video cameras are placed in an occupied space so as to image scenes in which people gather or pass through. The scenes are analyzed to determine information such as the busiest stores or venues, the longest lines, the highest level of interest reflected, the speed of traffic flow, etc. This information is analyzed and used to help visitors to the space in some way. For example, a visitor to a trade show might wish to identify a particular set of exhibits to visit first to enable the visitor to avoid the biggest crowds. Alternatively, the visitor may wish to identify the exhibits that appear to be the most popular. A visitor to a shopping mall might wish to navigate among several retail establishments in the shortest time exploiting available information about people movement and checkout queues.

User interfaces are provided to allow users to indicate the activity they wish to engage in or other preference information and the system will display instructions to the user to carry them out. For example, the visitor wishing to go to the parts of the trade show with the lowest levels of activity may be shown a map of the entire layout, with indications of where the greatest traffic is currently found. A shopper could identify the stores to be visited, and the system could plan the most efficient route. The system may gather data to permit probabilistic prediction of occupancy patterns to help insure that that changes in conditions don't destroy the value of its recommendations.

User interfaces may be fixed or portable. The navigation information may be delivered via a website, permitting users to employ their own wireless terminals for planning their visits to the spaces monitored by the video system. Data may be displayed as a real time map with overlay of symbols indicating crowd activity, traffic flow, congestion, queue length, and other information. Alternatively, a map may be distorted to illustrate the travel time between locations based on current traffic flow. Also, alternatively, the real time data may be displayed as a short message making recommendations based on indicated desires.

The invention will be described in connection with certain preferred embodiments, with reference to the following illustrative figures so that it may be more fully understood. With reference to the figures, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

DETAILED DESCRIPTION OF THE PREFERRED EMBODIMENTS

Figure 1A:
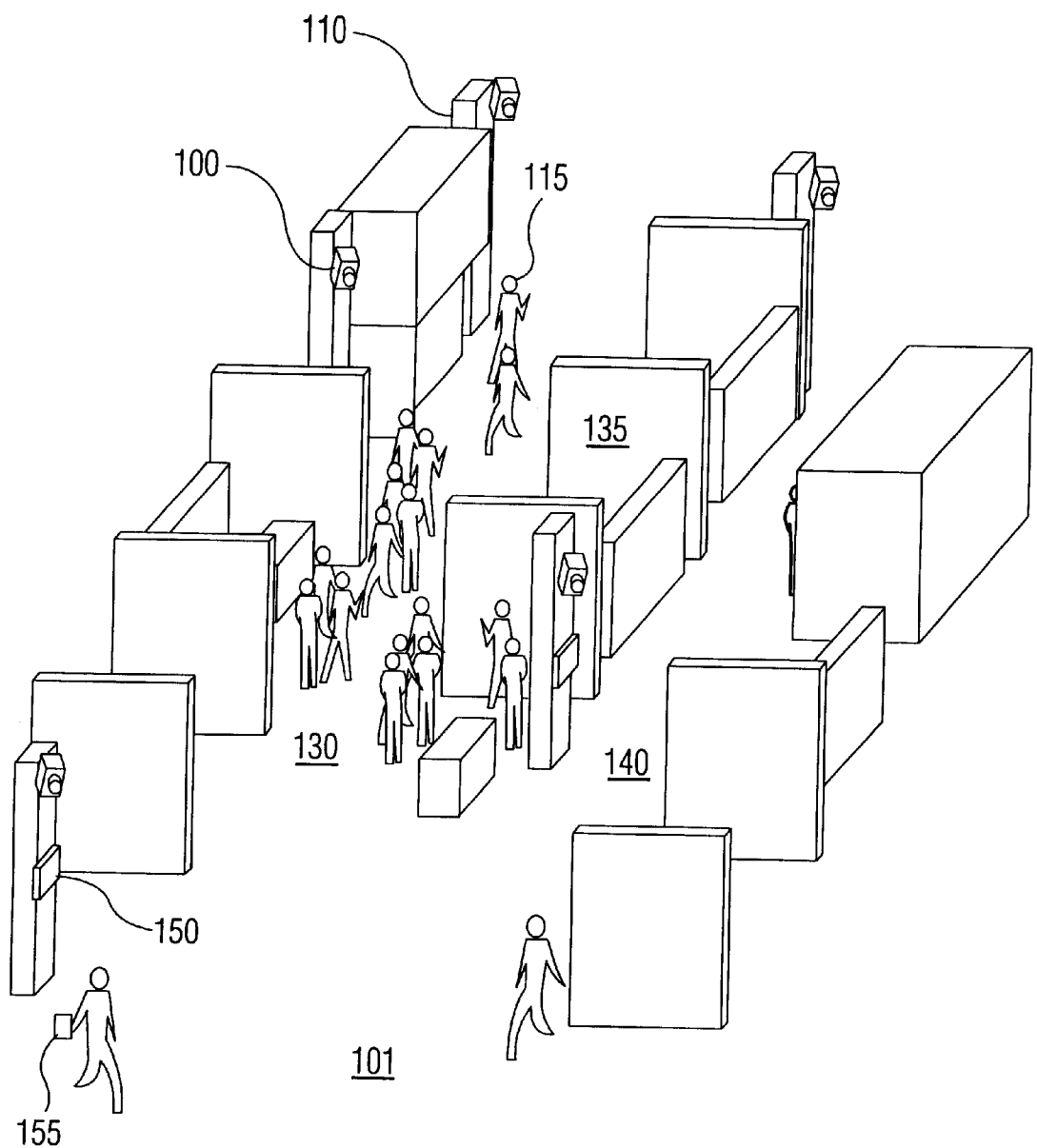
FIGS. 1A and 1B are perspective views of a public space such as an exhibit hall or shopping mall with video camera monitoring equipment and display terminals located throughout.

Referring to FIG. 1A, a space 101 where visitors 115 are gathered is monitored by cameras 100, each aimed at a respective portion (e.g., 130 and 140) of the space 101. The space 101 could be a trade show, shopping mall, an amusement park, an office, or any other space where people move and gather. Display terminals 150 are located throughout the space to permit the visitors 115 to obtain information derived from the video data gathered by the cameras 100, such as the shortest route to a destination or the area with the smallest crowds. Alternatively, this information may be provided to a remote terminal (not shown) or to a portable terminal 155.

Figure 1B:
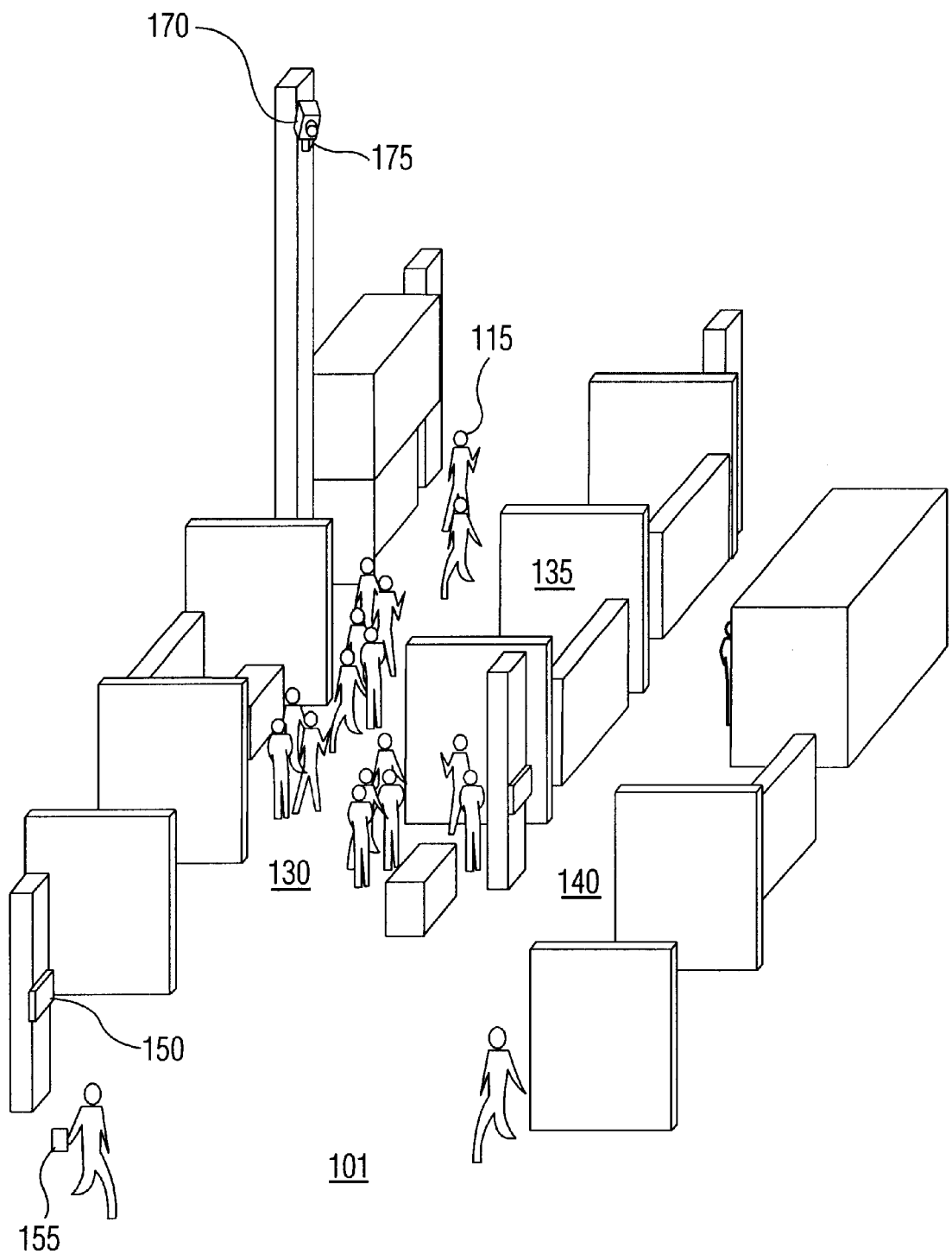

As illustrated in FIG. 1A, some areas of a venue, such as indicated at 130 may be more crowded than others, such as indicated at 140. The terminals, 150 and 155 may be programmed to permit users to enter requests for information, for example, to show a map of the space 101 indicating the crowd density by highlighting the map or overlaying with a suitable symbol or symbols. The user may make choices based on the feedback received and request navigation instructions. For example, the user could request the fastest route between retail stores or attractions, the least or most crowded attractions or areas, or the stores with the shortest lines. Armed with the requested information about the space 101 and navigation instructions, which may also be responsive to the requirements of the user the user can maximize his/her experience in the space 101 by avoiding crowds, moving quickly, attending the most popular attractions, or whatever the preferences indicate. Referring to FIG. 1B, in an alternative embodiment, a pan-tilt base 175 controls a zoom camera 170, the combination providing pan-tilt-zoom (PTZ) capability under control of a controller (not shown). In this embodiment, adequate information about the concentrations of visitors at the various locations is determined from a single camera vantage.

Figure 2:
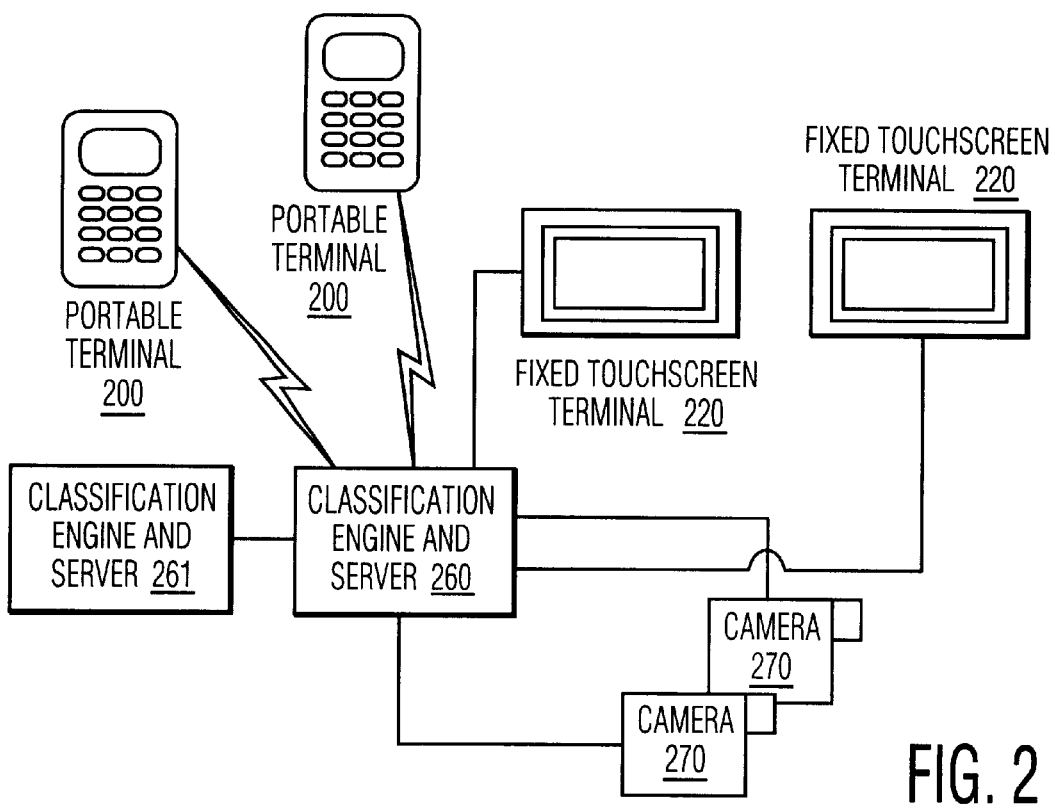
FIG. 2 is a block diagram of a hardware environment for implementing an automated people monitoring system according to an embodiment of the invention.

Referring to FIG. 2, the infrastructure for providing the functionality, which will be described in greater detail below, may include one or more fixed and/or portable terminals 200 and 220, respectively. These may be connected to a classification engine and server 260 by wireless or wired data links. The classification engine and server 260 may be connected to one or more cameras 270 such as CCD cameras. The classification engine and server 260 may be connected to one or more other classification engines and servers 261 (with additional terminals and cameras) to share data with other locations or the system could be centralized with only one classification engine and server 260, with all cameras and terminals connected to it. The classification engine and server 260 receives raw video data from the one or more cameras 270 and uses it to generate a real time indicator of patterns, such as crowd density by region. This data is further utilized by a user interface process running on the classification engine and server 260 for selective display responsive to user commands on the terminals 200 and/or 220.

Figure 3:
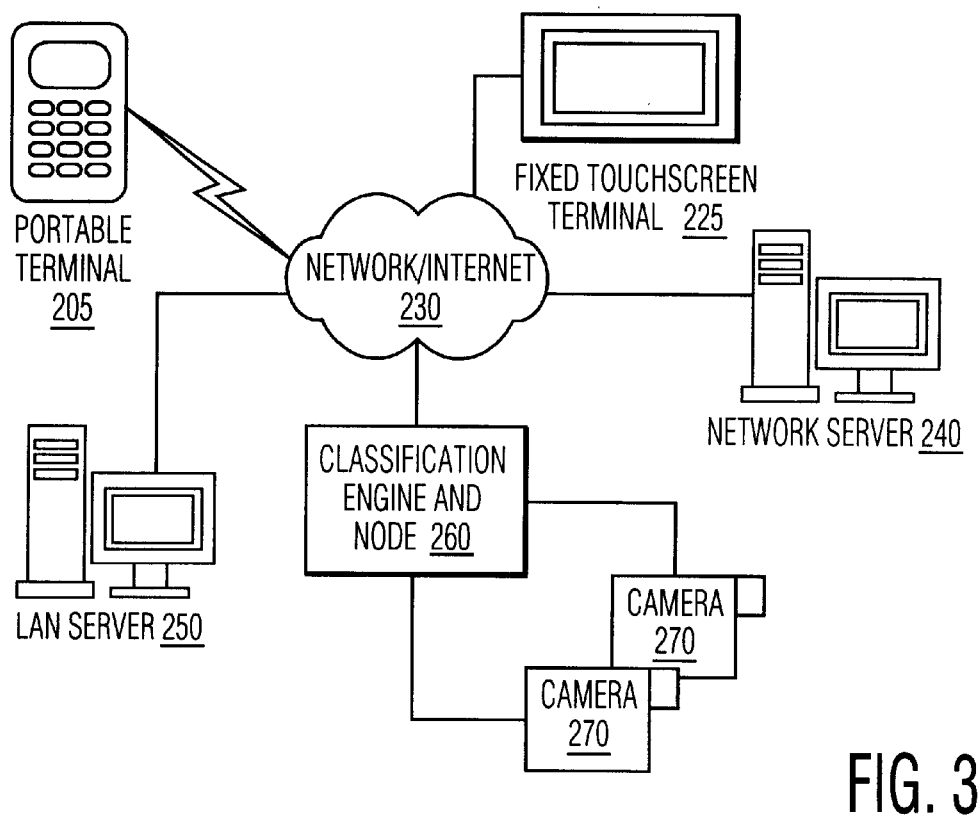
FIG. 3 is a block diagram of a hardware environment for implementing an automated people monitoring system according to another embodiment of the invention.

Referring now to FIG. 3, data generated by a classification engine and node 260 is provided to servers, such as network server 240 and/or 250, which generate user interface processes in response to request from the terminals such as a portable terminal 205 and a fixed terminal 225. The terminals 205, 220 may be Internet or network terminals connected to the server(s) 240 and or 250 by a network or the Internet. For example, if the terminals 205, 220 ran World Wide Web (WWW) client processes, the network servers 240, 250 could provide the data requested through those processes by means of dynamic web sites using well-known technology. In this manner, the terminals need only be Internet devices and various different user interface server processes may be established to provide for the needs of the various types of terminals 200, 220. For example, portable devices with small screens could receive text or audio output and larger terminals could receive map displays and/or the inputs tuned to the types of input controls available.

Figure 4:
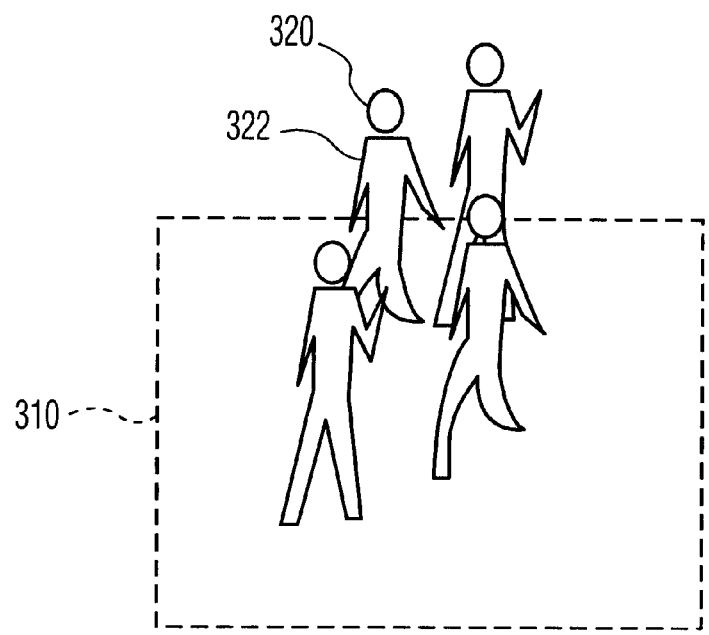
FIG. 4 is an illustration of a scene image of a camera with an oblique perspective view of a group of people moving through an imaginary aperture.
Figure 5:
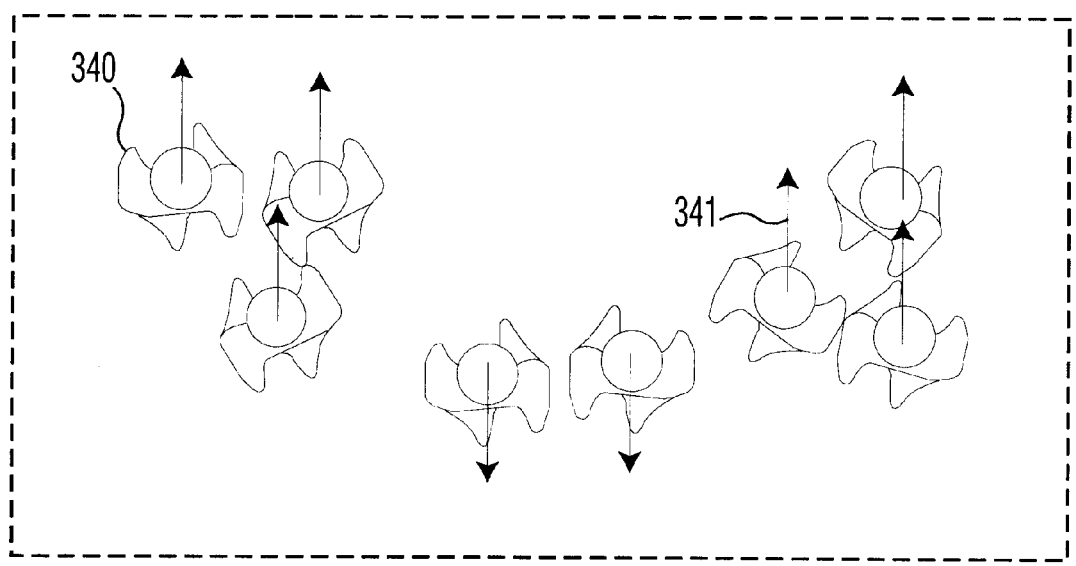
FIG. 5 is an illustration of a scene of a camera with an overhead view of groups of people moving.
Figure 10:
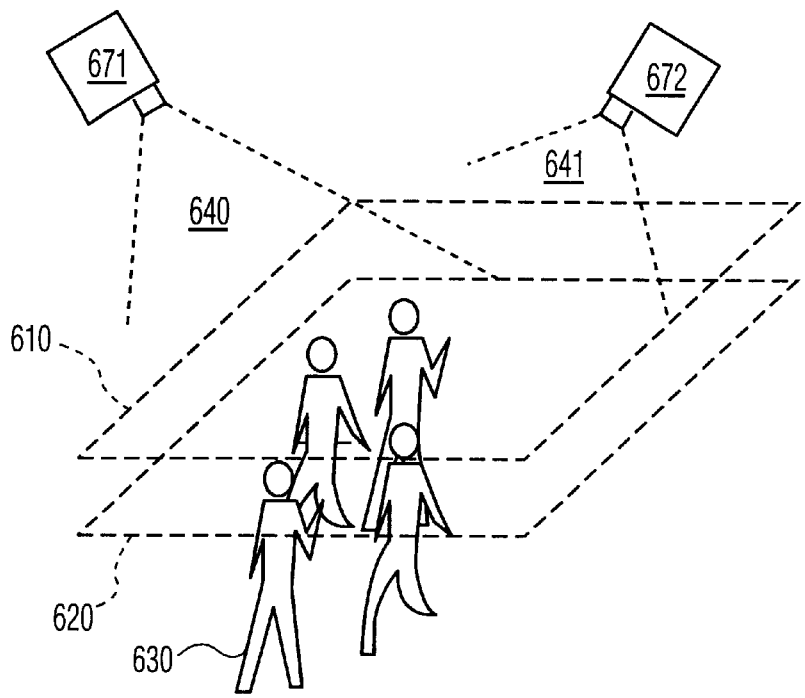
FIG. 10 is an illustration of a video person-counting system using multiple views to obtain three-dimensional information about a scene.

Referring now to FIGS. 4 and 5, the problem of determining the flow of people and their number in any given area of a scene captured by a camera is a routine one in terms of current image processing technology. For example, the heads 320 of individuals 322 can be resolved in a scene by known image processing and pattern recognition algorithms. One simple system selects the silhouettes of objects in the scene after subtracting the unchanging background and recognizes the features of heads and shoulders. The movement of each identified head can then be counted as they pass through an imaginary window 310 to determine the number of people present and the traffic flow through the window. This can be done in an even simpler way by resolving the movement of valleys (background) and peaks (non-background) in a mosaic-filtered image where the resolution of the mosaic is comparable to the size of the individuals present. Many different ways of counting individuals in a scene are possible and known in the art. Therefore, the subject will not be developed at length here. Note that an overhead view can be used for counting individuals just as can an oblique view such as shown in FIG. 4. In FIG. 5, an overhead view of moving individuals 340 is shown. In the overhead view, the calculation of number and flow can be even easier because the area of non-background can be probabilistically linked to a number of individuals and the velocities of the corresponding blobs determined from motion compensation algorithms such as used in video compression schemes. As indicated by the arrows 341, the direction and speed of the individuals 340 can be determined using video analysis techniques. These examples are far from comprehensive and a person of skill in the art of image analysis would recognize the many different ways of counting individuals and their movement and choose according to the specific feature set required for the given application. Referring momentarily to FIG. 10, three dimensional information about a location may be gathered through the use of multiple cameras 671 and 672 with overlapping fields of view 640 and 641. Using known image processing techniques, the heights of the heads of individuals may be obtained. Using this information, non-human objects moving through a scene or left behind may be better distinguished from visitors reducing errors in counting.

Image processing and classification may also be employed to determine the delays suffered by visitors to a particular destination, for example, the average amount of time spent inside an exhibit or the time waiting in a queue. A classification engine may be programmed to recognize queues of people waiting at a location, for example a checkout line. For example, the members of a group of people who remain in a relatively fixed location for a period of time at a location in a scene defined to the system to be in the vicinity of a cash register may be counted to determine the queue length. The queue length may be correlated with a delay time based on a probabilistic estimate or by measuring, through image processing, the average time it takes for a person to reach the end of the queue. Alternatively, the occupancy rate of the location may be used as an indicator of how long it would take a visitor/customer to pass through.

Figure 6:
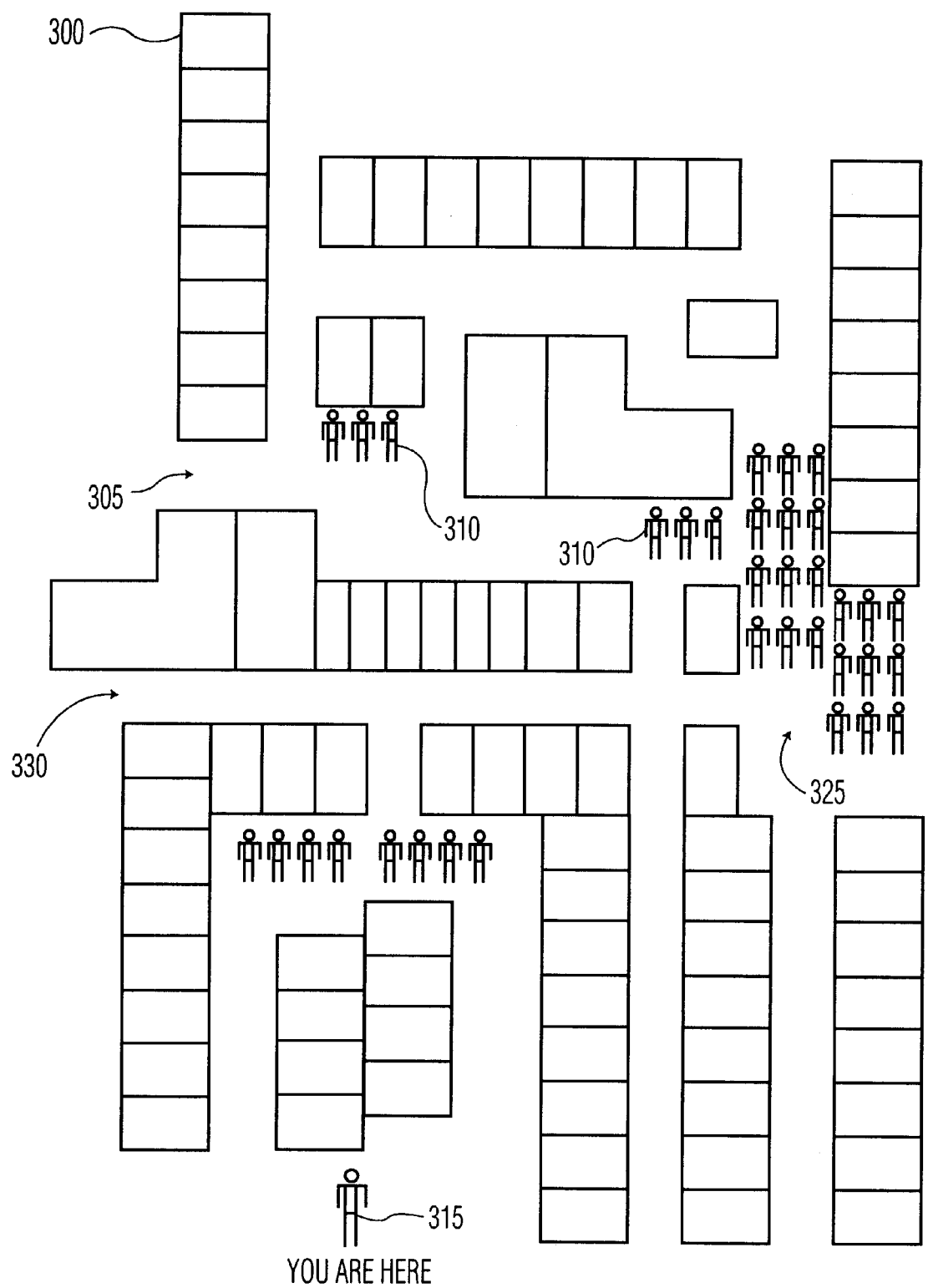
FIG. 6 is an illustration of a map showing courses and destinations overlaid with crowd density information.

Referring to FIG. 6, a map of an exhibition- or retail-like spaces shows variously-sized blocks 300 which could correspond to exhibits or stores. The location of a visitor using the system is indicated at 315. The corridors between them 305 are areas where visitors are gathered or moving between exhibits. The map is overlaid with icons 310 representing the density of visitors gathered at particular locations. In the illustrated map, the area indicated at 325 has a high density of visitors and the area indicated at 330 has a low density as indicated by the presence of the overlaid icons 310 and their absence, respectively. The icons may be generated on the display when the crowd density is determined to have exceeded a threshold. It is assumed that the map shows further detail that is not illustrated, such as identifiers of the attractions, exhibits, stores, etc. with a corresponding legend as required.

Figure 7:
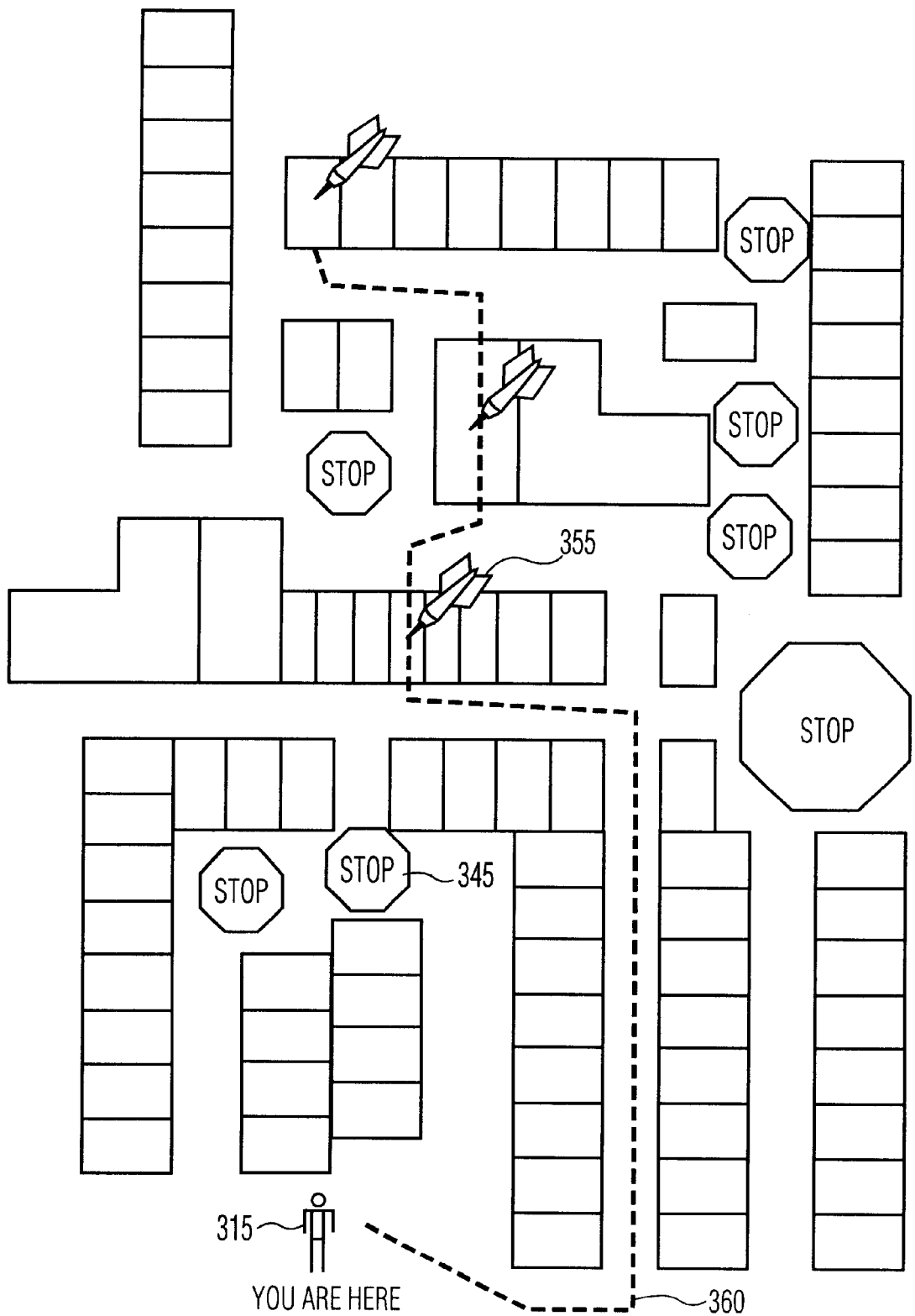
FIG. 7 is an illustration of a map showing courses and destination overlaid with crowd density information as well as a least-cost path through multiple destinations.

Referring now to FIG. 7, a map similar to that shown in FIG. 6 is overlaid with an alternative type of symbol to indicate areas where passage is made difficult by heavy traffic and areas that are less difficult. In the illustrated embodiment, the planning of a most favorable route through a space is performed by the system in response to a particular request by the user. For example, the user could identify to the system a set of stores or exhibits the user wishes to visit. Then the system, using information about the traffic speed and occupant density, as well as the locations of the destinations, could calculate the shortest route between the destinations. The current display also uses a different type of pattern indicator to show that certain areas are difficult to navigate.

The minimum time between destinations may be solved using a travelling salesman algorithm or other cost (e.g., travel-time=cost) minimizing methodology. According to an embodiment of the invention, the foot traffic speed, current or delay time at a destination (for example that might be estimated from a cashier queue length) may be folded into the cost minimization method so that the best path depends on visiting the stores with the shortest queues. A robust approach to such a cost-minimization problems is A* path planning, which can also deal efficiently with the problem of dynamically updating a least-cost path when conditions change. Dynamic programming is also a robust method for solving such problems. Other methods are also known in the art. A* is described in the following patents and applications, which are hereby incorporated by reference as if fully set forth in their entireties herein: U.S. Pat. No. 5,083,256 for Path Planning with Transition Changes, K. Trovato and L. Dorst. Issued Jan. 21, 1992 and filed Oct. 17, 1989; U.S. Pat. No. 4,949,277 for Differential Budding: Method and Apparatus for Path Planning with Moving Obstacles and Goals, K. Trovato and L. Dorst issuing Aug. 14, 1990 and filed Mar. 10, 1988; and U.S. patent application Ser. No. 07/123,502 for Method and Apparatus for Path Planning, L. Dorst & K. Trovato, filed Nov. 20, 1987.

Other alternatives for illustrating the traffic flow and occupant density information on a map are available. For example, coloring of the map to indicate the speed of flow (e.g., redder for slow-moving and greener for faster moving) and delay time detected in stores or exhibits. A map could also be distorted to illustrate travel time between destination. Destinations with short travel times between them, based on distance as well as current crowd density, speed and/or direction of movement, could be shown closer together and those with long travel times between them could be shown further apart.

Figure 8:
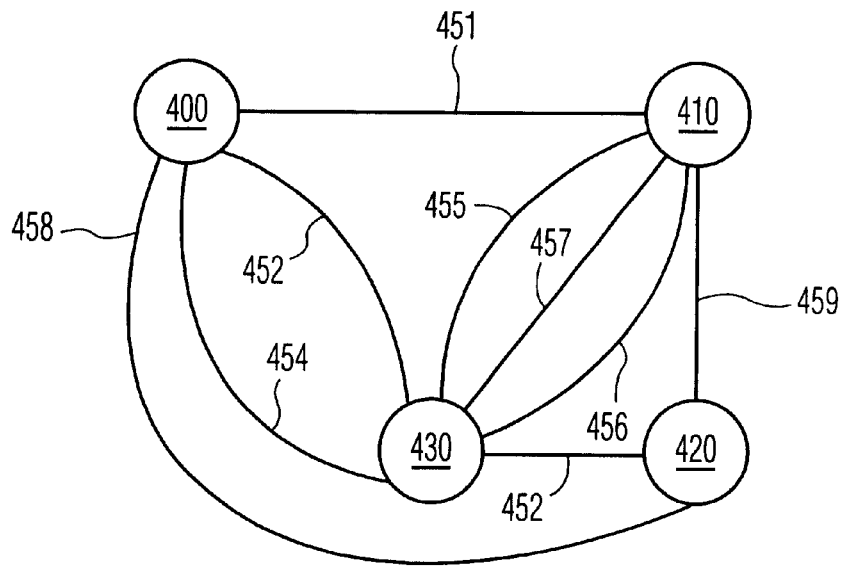
FIG. 8 is an illustration of a model of a graph search problem corresponding to a method for recommending an optimal route through a space according to an embodiment of the invention.

Referring to FIG. 8, as discussed above, the least-cost path through a set of destinations, the cost including delays at the destinations as well as due to foot traffic conditions along routes, may be modeled as a graph search problem. Assume that a user selects a number of destinations at a terminal, either particularly or generically, and assume the availability of information about people density and movement, and their presence in queues, which comes from the video camera(s) 270. Each of the nodes 400, 410, 420, and 430 corresponds to a destination. If a destination is identified by the user generically (e.g., "department store," as opposed to a particular department store, then some nodes may form a set of options which may be included in an optimal route. Links between destinations 451–459 correspond to alternative routes between nodes. Since the routes vary in terms of travelling distance and crowd density, traffic direction and volume, average speed, etc., each route has its own calculatable time-cost associated with it.

Figure 9:
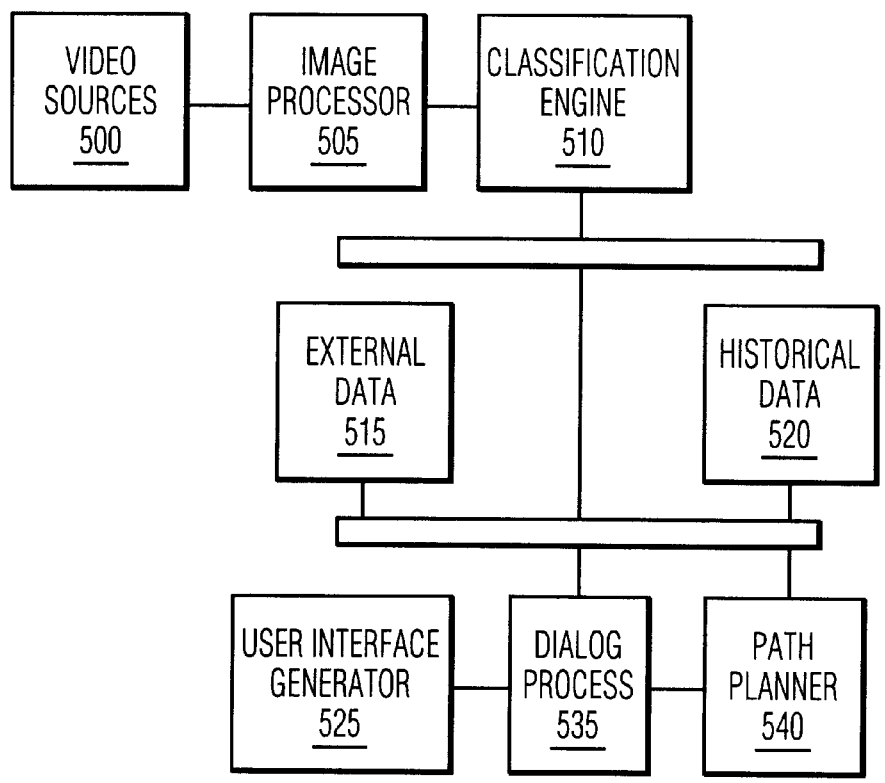
FIG. 9 is a block diagram of functional components of a process for performing a method according to an embodiment of the invention.

In the illustration of FIG. 8, nodes 410 and 430 could be alternative destinations for a given path-planning problem. For example, the user may have indicated that s/he wants to visit a hardware store, both nodes 410 and 430 being hardware stores, and a particular lingerie store indicated by 400. The user is currently located at a position corresponding to node 420. There are Referring to FIG. 9, the functional elements of an embodiment of a system that provides data for visitors to an event or space with multiple destinations and routes is shown. Video sources 500 gather current data and supply these data to an image processor 505. The latter preprocesses the images and video sequences for interpretation by a classification engine 510. In an alternative embodiment, the image processor may be a Motion Pictures Expert Group (MPEG) compression or other compression process that generates statistics from the frames of a video sequence as part of the compression process. These may be used as a surrogate for prediction of crowd density and movement. For example, a motion vector field may be correlated to the number of individuals in a scene and their velocity and direction of movement.

The classification engine 510 calculates the number of individuals in the scene(s) from data from the image processor 505. The classification engine 510 identifies the locations, motion vectors, etc., of each individual and generates data indicating these locations according to any desired technique, of which many are known in the prior art. These data are applied to subprocesses that calculate occupancy, movement, and direction 530. Of course the roles of these subprocesses may or may not be separate as would be recognized by a person of ordinary skill and not all may be required in a given implementation. The classification engine 510 may be programmed to further determine the types of activities in which the individuals in the scenes are engaged. For example, the classification engine 510 may be programmed to recognize queues. Further it may be programmed to distinguish masses of individuals that are moving through an area from masses that are gathered in a location. This information may be useful for indicating to visitors the areas that are the most popular, as indicated by crowds that are gathered at a location, as opposed to areas that simply contain traffic jams. Thus, it may generate a number of persons moving through and a number of persons gathered at a location. The results of the classification engine 510 calculations are applied to a dialogue process and a path planner along with external data 515. The classification results are also applied to a data store as historical data 520 from which probabilistic predictions may be made. A dialogue process 535 gathers and outputs the historical and real time information as appropriate to the circumstance. For example, if immediate conditions are to be output, the dialogue process would rely chiefly upon the real-time data from the classification engine 510. If the conditions warrant use of historical data 530, such as when a user accesses the system from the Internet and indicates a desire to visit at a later data or hour, the dialogue process 535 may calculate and provide predictions of visitor crowd density based on historical information and external data 515 such as economic conditions and other data as discussed below. Route planning may be provided to the dialogue process by a path planning engine 540, which could use techniques such as dynamic programming or A* path planning, as discussed below.

As mentioned, the statistics outputted to visitors to an exhibition or the route recommendations made, may be based on probabilistic determinations rather than real time data. For example, the time it takes for a route to be followed may be long enough that the crowd patterns would change. Also, according to embodiments, the system may provide information to visitors/customers, before they arrive at the exhibition-like event. In such cases, the crowding may be predicted based on probabilistic techniques, for example as described in U.S. Pat. No. 5,712,830 incorporated by reference above. Thus, the system may gather data over extended periods of time (weeks, months, years) and make predictions based on factors such as day of week, season of year, holidays, etc. The system may be programmed from a central location with discount factors based on current external information that are known to affect behavior, such as the price of gasoline, inflation rate, consumer confidence, etc. Also, the system may receive information about sales and other special events to refine predictions. For example, it would be expected for special store or exhibit events to draw crowds. A store might have a sale or a tradeshow might host a movie star at a particular time and date.

Note that time is not the only criterion that may be used to calculate a cost for the routing alternatives. For some users, the dominant cost may be walking distance or walking time. In such a case, the availability of an alternative means of transportation would affect the costs of the alternative routes. Also note that a route's time and walking distance cost could depend on the frequency of departures, the speed of the transportation, etc. A user could enter information about the relative importance of walking distance or walking time as an inconvenience or comfort issue and the costs of the different alternative routes could be amplified accordingly. Thus, a route that takes more time, but which involves less cost, would be preferred by a user for whom walking distance or walking time is a high cost, irrespective of the time-cost.

Figure 14:
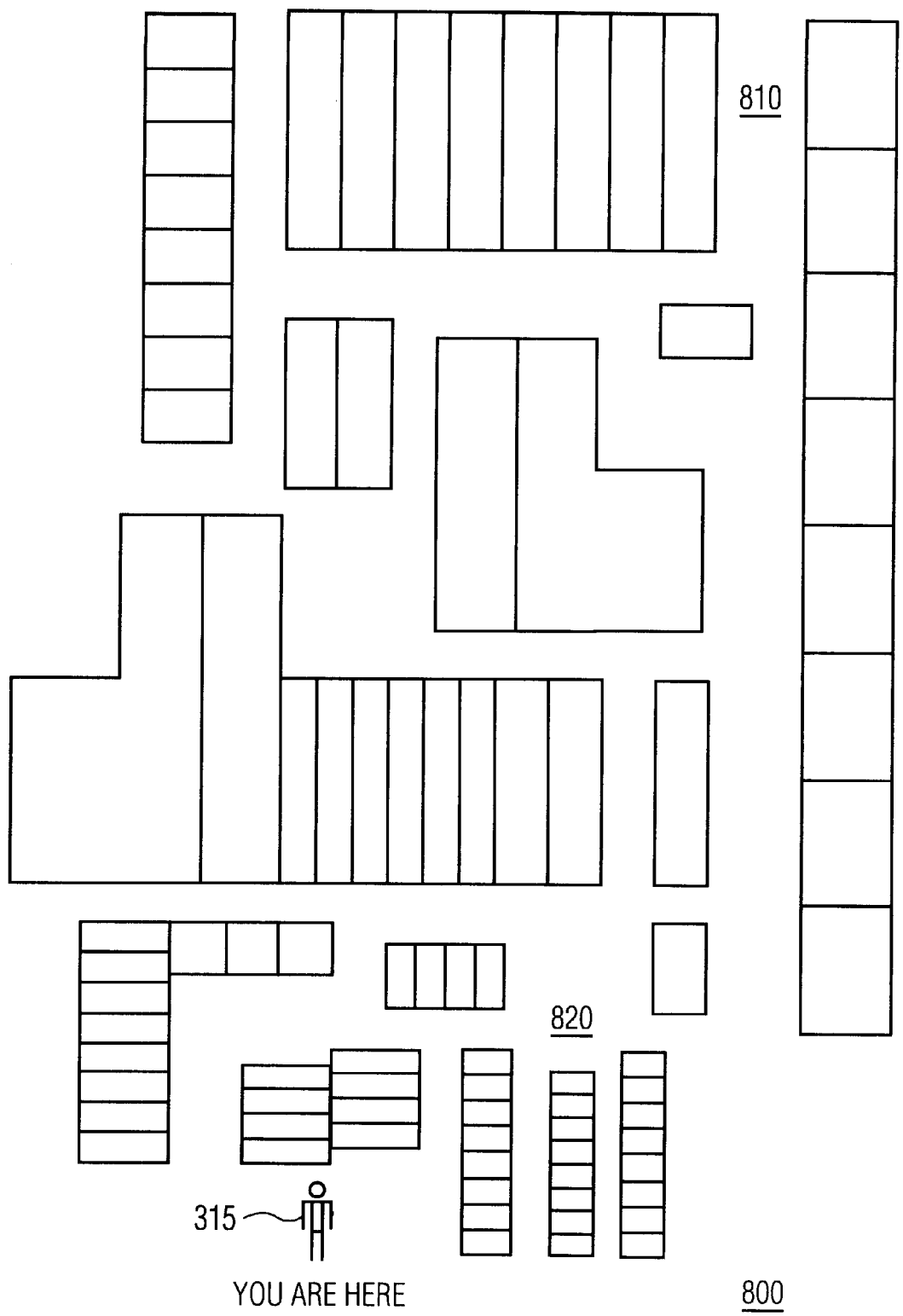
FIG. 14 is a map display that shows the effects of travel time as a distortion of the layout of the area defined by the map.

Referring to FIG. 14, another way to illustrate the effect of crowd density and movement on travel time is to present a distorted map of the covered area. In the map 800 of FIG. 14, some locations appear closer to the user's position 315 than others as a result of a distortion operation on the map. For example, location 810 is relatively further away from the user's location 315 and location 820 is relatively closer as a result of the distortion.

A handheld device may provide instructions for a next destination based on entered preferences, for example an indication that the next desired destination is a "hardware store." In this case, the handheld terminal (e.g., portable terminal 155) may incorporate a global positioning system (GPS) receiver allowing it to provide instructions to the next destination. The device may deliver instructions based on criteria entered by the user, such as closest destination of desired class (e.g., closest hardware store), biggest destination of desired class, shortest travel time, etc. The system would then provide directions to the destination that best matches the preferences. These instructions may be given as audio, text, a map display or by way of any other suitable output mechanism.

Figure 11:
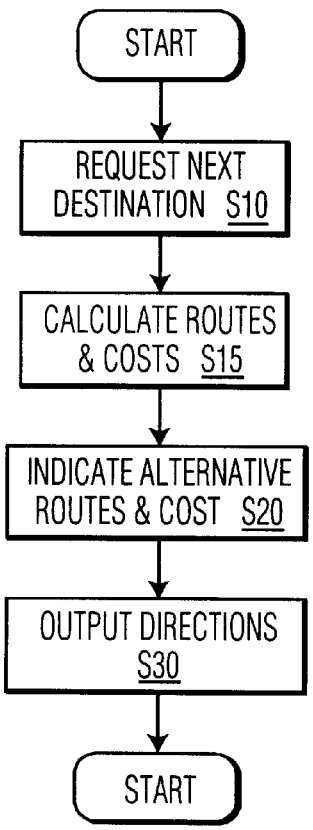
FIG. 11 is a flow chart of a process for recommending a destination and route.

Referring to FIG. 11, an example process for making route recommendations, for example in a shopping mall, begins with a request for a next destination S10. Routes are calculated with attending costs (time including delays due to crowds, walking time, walking distance, etc.) in step S15. Then the alternative routes are shown (or one is automatically selected based on user preferences) in step S20. One route may be selected and the directions output in step S30. The above process may occur in conjunction with a portable terminal or at a fixed terminal. User preferences may be stored on the portable terminal so that they do not have to be entered each time the user desires a recommendation. For example, the user could specify that s/he always wants directions based on least-cost in terms of time and walking distance does not matter.

Figure 12:
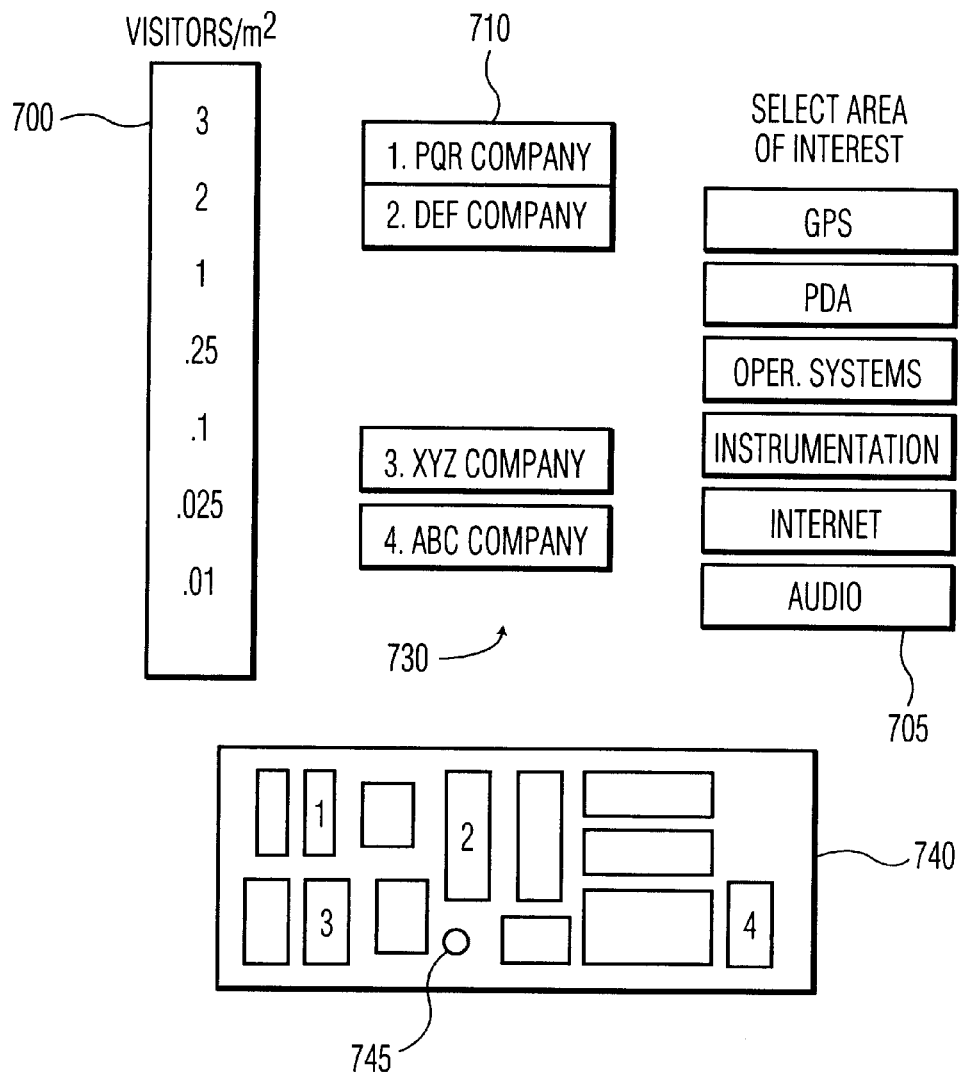
FIG. 12 is a diagram of a display process for showing crowd information at an exhibition-like event.
Figure 13:
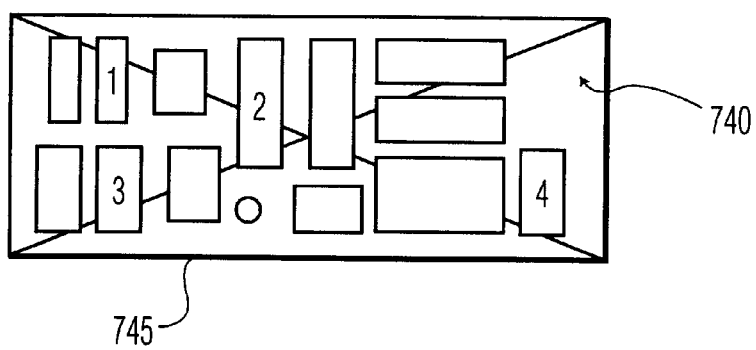
FIG. 13 is a portion of an alternative embodiment of the display process of FIG. 12.

Referring to FIG. 12, an illustration of a user interface process including a map display at a trade show is shown. The user selects a control 705 (e.g., touchscreen control) indicating a class of exhibitor the user wishes to visit. For example, the classes may be defined by product area. Then the exhibitors 730 belonging to the selected class are shown in positions along a scale 700 to illustrate the crowd density in the vicinity of each exhibitor. For example a banner for PQR company 710 is shown next to the scale 700 at a level of between 2 and 3 persons m/$^2$. A map 740 is shown indicating the locations of the exhibitors belonging to the selected class and the user 745. Referring to FIG. 13, in an alternative embodiment of the display of FIG. 12, a map 750 shows the crowd density as a color overlay or graying of the occupied areas.

It will be evident to those skilled in the art that the invention is not limited to the details of the foregoing illustrative embodiments, and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claims is:

1. A method for assisting a user in navigating a three-dimensional space with multiple destinations, comprising:
imaging at least two scenes of said destinations to produce first and second images;
calculating, from a result of said imaging, numbers of persons in said scenes and costs including crowd density depending thereon;
generating an output responsive to said costs.

2. A method as in claim 1, wherein said step of generating includes calculating a least-cost path through said destinations.

3. A method as in claim 2, further comprising recognizing a queue in at least one of said scenes and calculating a predicted time waiting in said queue, said step of calculating including calculating costs responsively to said time waiting.

4. A method as in claim 1, wherein said step of generating includes outputting a display showing a map of a recommended route through said space.

5. A method as in claim 4, wherein said outputting includes outputting an iconized representation showing said costs within said space.

6. A method as in claim 1, wherein said step of generating includes generating an output at a fixed terminal available to visitors of said space.

7. A method as in claim 6, wherein said space includes a shopping mall.

8. A method as in claim 1, wherein said scenes includes scenes of checkout registers.

9. A method as in claim 1, wherein said step of generating includes outputting a display showing a map with a distortion of the area defined by said map wherein said distortion is representative of said costs.

10. A shopper information system, comprising:
a controller with an input adapted to receive video data responsive to multiple scenes of shoppers at a shopping venue, each scene being of a different respective physical three-dimensional location of said shopping venue;
said controller being programmed to calculate a current density of occupancy of said physical three-dimensional locations responsively to said video data;
said controller being further programmed to calculate and output an indication of an optimum route or next destination based on said current density of occupancy;
said controller being located for access by shoppers at said shopping venue.

11. A system as in claim 10, wherein said output includes a map display with an overlay indicating least-cost route through said shopping venue.

12. A system as in claim 10, wherein said output includes a text or audio message indicating a recommended route.

13. A system as in claim 12, wherein said controller is further programmed to accept a shoppers input indicating a shoppers preference relating to density of shoppers at a location and calculate said optimum route responsively to said input indicating said shoppers preference.

14. A system as in claim 10, further comprising at least one pan-tilt-zoom (PTZ) video camera said video data being derived from said PTZ video camera, said controller being programmed to operate said PTZ video camera.

15. A system as in claim 10, wherein said output is a wireless signal readable by a portable terminal.

16. A method of providing navigation guidance to visitors of a shopping venue, comprising the steps of:
receiving input at a controller providing real-time data responsive to at least one of a three-dimensional density and rate of movement of shoppers at various locations of a shopping venue;
calculating at said controller a local variation in three-dimensional density or rate of movement of shoppers at said various locations;
recognizing in at least one of said various locations a queue and predicting a delay from a series of images of said queue;
outputting at a terminal, accessible to shoppers at said shopping venue, data indicating an optimal route responsively to said delay.

17. A method as in claim 16, wherein step of outputting includes generating a map of said space overlaid with a graphic representation of said three-dimensional density or rate of movement.

18. A method as in claim 16, wherein said step of outputting includes generating a wireless signal containing a result of said step of predicting.

19. A method as in claim 16, further comprising a step of controlling a pan-tilt-zoom camera to view said various locations.

20. A method as in claim 16, wherein said step of calculating includes updating a background image and subtracting said background image from a current video image.

21. A shopper information system, comprising:
a controller with an input adapted to receive video data responsive to multiple scenes of shoppers at a shopping venue, each scene being of a different respective three-dimensional physical location of said shopping venue;
said controller being programmed to a calculate a current density of occupancy of said three-dimensional physical locations responsively to said video data;
said controller being further programmed to calculate an indication of an optimum route or next destination based on said current density of occupancy;
said controller having a wireless output for outputting messages to wireless devices, said messages indicating said optimum route or next destination.

* * * * *